US006715641B2

(12) United States Patent
Torimitsu et al.

(10) Patent No.: US 6,715,641 B2
(45) Date of Patent: Apr. 6, 2004

(54) METHOD AND APPARATUS FOR CORRECTING COCK DRIVING DEVICE IN BEVERAGE DISPENSER

(75) Inventors: Hiroshi Torimitsu, Nagoya (JP); Akira Ogawa, Toyoake (JP); Sukehide Itou, Toyoake (JP); Naomoto Amano, Okazaki (JP); Shigekazu Kondou, Toyoake (JP); Satoru Kobayashi, Chita-gun (JP); Shigeaki Tamaki, Ichinomiya (JP); Kouji Sutou, Oobu (JP)

(73) Assignee: Hoshizaki Denki Kabushiki Kaisha, Aichi (JP)

( * ) Notice: Subject to any disclaimer, the term of this patent is extended or adjusted under 35 U.S.C. 154(b) by 0 days.

(21) Appl. No.: 09/955,546

(22) Filed: Sep. 18, 2001

(65) Prior Publication Data

US 2003/0052290 A1 Mar. 20, 2003

(51) Int. Cl.[7] .......... F16K 31/02
(52) U.S. Cl. .......... 222/63; 222/400.7; 251/129.04
(58) Field of Search .......... 251/129.04; 222/400.7, 222/63, 14

(56) References Cited

U.S. PATENT DOCUMENTS 3,221,936 A * 12/1965 Spinuzza .......... 222/504
3,355,068 A * 11/1967 Harland et al. .......... 222/30
3,380,629 A * 4/1968 Kontra et al. .......... 222/504
3,718,233 A * 2/1973 Nordhoff .......... 251/129.2
4,111,243 A * 9/1978 Fetterman .......... 251/129.2
4,226,343 A * 10/1980 Fling .......... 222/504
5,022,557 A * 6/1991 Turner .......... 222/54
5,044,528 A * 9/1991 Becker .......... 222/504
5,363,989 A * 11/1994 Zeamer et al. .......... 222/16
5,431,302 A * 7/1995 Tulley et al. .......... 222/14
5,845,824 A * 12/1998 Weimer et al. .......... 222/509
6,398,084 B2 * 6/2002 Maruyama et al. ...... 222/400.7

* cited by examiner

*Primary Examiner*—John Bastianelli
(74) *Attorney, Agent, or Firm*—Koda & Androlia

(57) ABSTRACT

A method and apparatus for correcting a cock driving device in a beverage dispense. A manipulating lever for a dispensing cock is correctly opened and closed at all times by the cock driving device. The manipulating lever for the dispensing cock is provided with an interlock member which moves back and forth integrally with the lever, and the interlock member is provided with a magnet. A pair of hole elements capable of sensing the magnet are arranged one behind the other, spaced from each other, on a mounting plate arranged on a slider. The magnet is set to face an intermediate position of both hole elements of the slider staying at a standby position, with the dispensing cock staying at a neutral position. A control board moves the slider for correction to a position at which the magnet reaches the intermediate position of the hole elements if the magnet does not face the intermediate position of the pair of hole elements.

2 Claims, 7 Drawing Sheets

(b)

(a)

(b)

(a)

(b)

(a)

(b)

(a)

METHOD AND APPARATUS FOR CORRECTING COCK DRIVING DEVICE IN BEVERAGE DISPENSER

FIELD OF THE INVENTION

This invention relates to a beverage dispenser, and more particularly, to a method and apparatus for correcting a cock driving device which automatically opens and closes a manipulating lever for a dispensing cock arranged on the body of a dispenser for dispensing a beverage.

DESCRIPTION OF THE RELATED ART

An apparatus for dispensing a sparkling drink through lever manipulations, for example, a beer server is provided with a manipulating lever on a dispensing cock arranged on its body. The lever is manually tilted in one direction to dispense a predetermined amount of beer into a mug, and then the lever is tilted in the opposite direction to pour fine foam of beer on the dispensed beer in the mug. However, in manually dispensing beer and foam through manipulations of the lever, the dispensed amounts may differ from one operator from another. To solve this problem, an automatic dispensing apparatus is disclosed in Japanese Unexamined Patent Publication No. Hei 9-48498 as a technique proposed for automatically manipulating the lever by a driving device. In this apparatus, a motor arranged in a body is coupled to a dispensing cock manipulating lever through an attachment and a screw shaft to move the manipulating lever back and forth by normal and reverse rotations of the motor to dispense beer and foam.

The above-mentioned automatic dispensing apparatus is configured to move the manipulating lever between an open position and a closed position by controlling a rotation time of the motor using a timer. In this event, a shift in positions at which the dispensing cock and motor are mounted, relative to the server body, would result in a shift in relative position of the motor to the manipulating lever. If the motor is controlled by a previously set timer in this state, the manipulating lever could not be fully opened or be moved more than necessary in an opening direction to apply a load on the lever. In addition, even if the manipulating lever is moved from the open state to the closed state, the lever is not stopped correctly at the closed position, resulting in a leak.

It should be noted that the closed position of the manipulating lever may shift due to aging changes such as deformation of a rubber material arranged in a dispensing cock for blocking a beer passage port due to abrasion, deformation of a mount for mounting a manipulating lever on a cock body due to forward and backward movements of the lever, and the like. Therefore, similar problems to the foregoing will arise if the manipulating lever is manipulated by a driving device with the shifted state left uncorrected.

SUMMARY OF THE INVENTION

The present invention has been made in view of and for preferably solving the foregoing defects inherent in the cock driving device for a beverage dispenser according to the prior art. It is therefore an object of the present invention to provide a method and apparatus for correcting a cock driving device in a beverage dispenser which are capable of correctly opening and closing a manipulating lever for a dispensing cock at all times using the cock driving device.

To solve the aforementioned problems and achieve the intended object, the present invention provides a method of correcting a cock driving device in a beverage dispenser comprising an actuator configured to come into engagement with a manipulating lever for a dispensing cock arranged on a body, wherein the actuator is moved to a standby position and to an operative position to move the manipulating lever to a closed position and to an open position, comprising the steps of:

sensing by sensing means provided in the actuator whether or not a sensed element of the manipulating lever staying at the closed position reaches a regular position with respect to the actuator staying at the standby position; and moving the actuator for correction to a position at which the sensing means senses the arrival of the sensed element at the regular position, and setting this position as a new standby position if the sensing means does not sense the arrival of the sensed element at the regular position.

To solve the aforementioned problems and achieve the intended object, the present invention also provides an apparatus for correcting a cock driving device in a beverage dispenser comprising an actuator configured to come into engagement with a manipulating lever for a dispensing cock arranged on a body, wherein the actuator is moved to a standby position and to an operative position to move the manipulating lever to a closed position and to an open position, the cock driving device in the beverage dispenser, comprising:

a sensed element arranged in an interlock member integrally movable with the manipulating lever;

sensing means arranged in the actuator for sensing whether or not the sensed element of the manipulating lever staying at the closed position reaches a regular position with respect to the actuator; and control means for moving the actuator for correction to a position at which the sensing means senses the arrival of the sensed element at the regular position if the sensing means does not sense the arrival of the sensed element at the regular position when the actuator is moved from the operative position to the standby position to move the manipulating lever from the open position to the closed position.

DETAILED DESCRIPTION OF THE EMBODIMENT

Next, a method and apparatus for correcting a cock driving device in a beverage dispenser according to the present invention will hereinafter be described for a preferred embodiment thereof with reference to the accompanying drawings. It goes without saying that while the following embodiment is described for a beer server illustrated as an example of the beverage dispenser, the present invention is not limited to this but may be applied to a dispenser for dispensing juice, other beverages, and the like.

Figure 1:
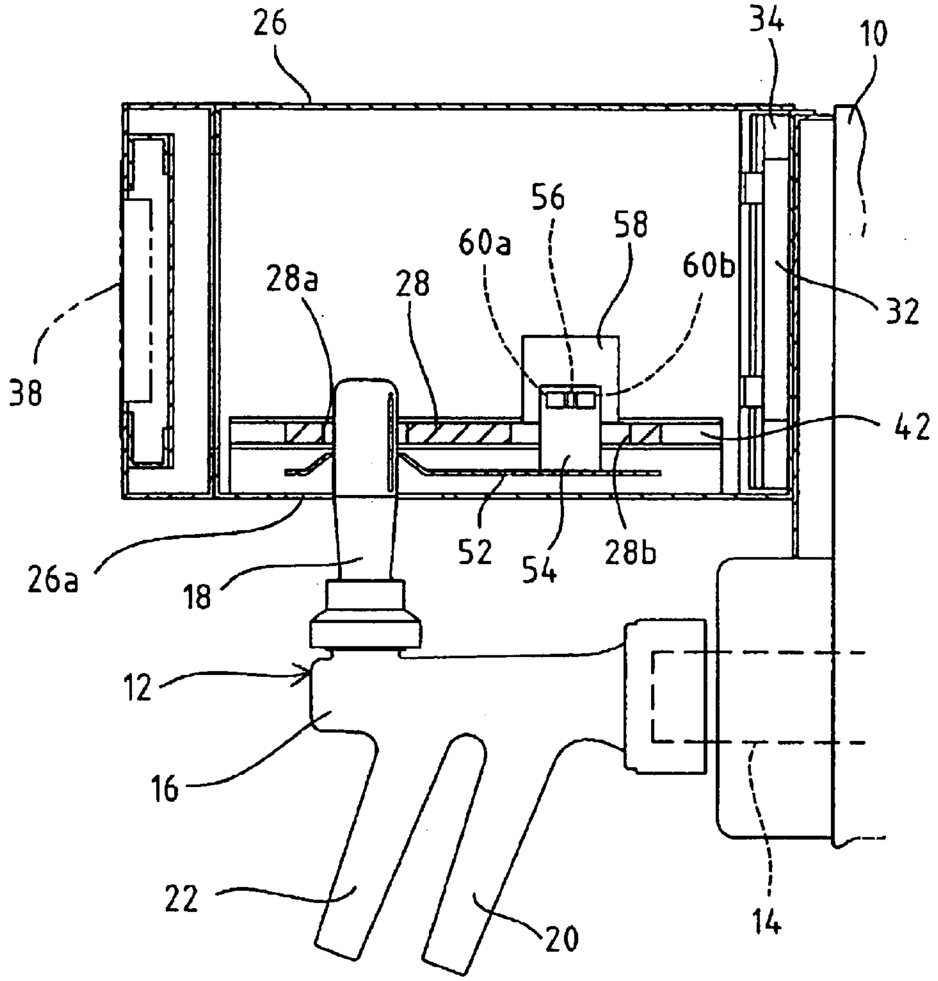
FIG. 1 is a vertical sectional view illustrating a cock driving device arranged in a beer server according to a preferred embodiment of the present invention in a state in which a manipulating lever can be automatically manipulated.

FIG. 1 illustrates a main portion of a beer server according to the preferred embodiment. A dispensing cock 12 is arranged on a front surface of a body 10 of the server, and a beer supply tube 14, extending horizontally from the server body 10, is connected to the cock 12. The dispensing cock 12 is basically comprised of a cock body 16 which contains a variety of valve mechanisms (not shown) for opening/closing passage ways of beer and foam; and a manipulating lever 18 extending upward from the cock body 16 for switching beer and foam to be dispensed through forward and backward tilting operations. The cock body 16 in turn comprises a beer dispensing nozzle 20 and a foam dispensing nozzle 22 parallelly extending diagonally downward. In FIG. 1, the right-hand nozzle extending diagonally downward from the cock body 16 is the beer dispensing nozzle 20, and the left-hand nozzle is the foam dispensing nozzle 22.

The manipulating lever 18, in this embodiment, is tilted forward to actuate (open) the valve mechanism to dispense beer from the beer dispensing nozzle 20, and tilted backward to actuate (open) the valve mechanism to dispense foam from the foam dispensing nozzle 22. Also, the manipulating lever 18 is positioned at a neutral position (a closed position substantially at a vertical posture) between a beer dispensing position (open position) and a foam dispensing position (open position) at all times, when not operated, by a spring of the valve mechanism contained in the cock body 16, so that the valve mechanism is held in a closed state. Then, the manipulating lever 18 is configured for automatic manipulation by a cock driving device 24 arranged on the front surface of the server body 10. On the front surface of the server body 10, a carrier for carrying a mug (container), though not shown, is disposed at a position below the dispensing cock 12, such that beer and foam are dispensed into a mug carried on the carrier.

Figure 3:
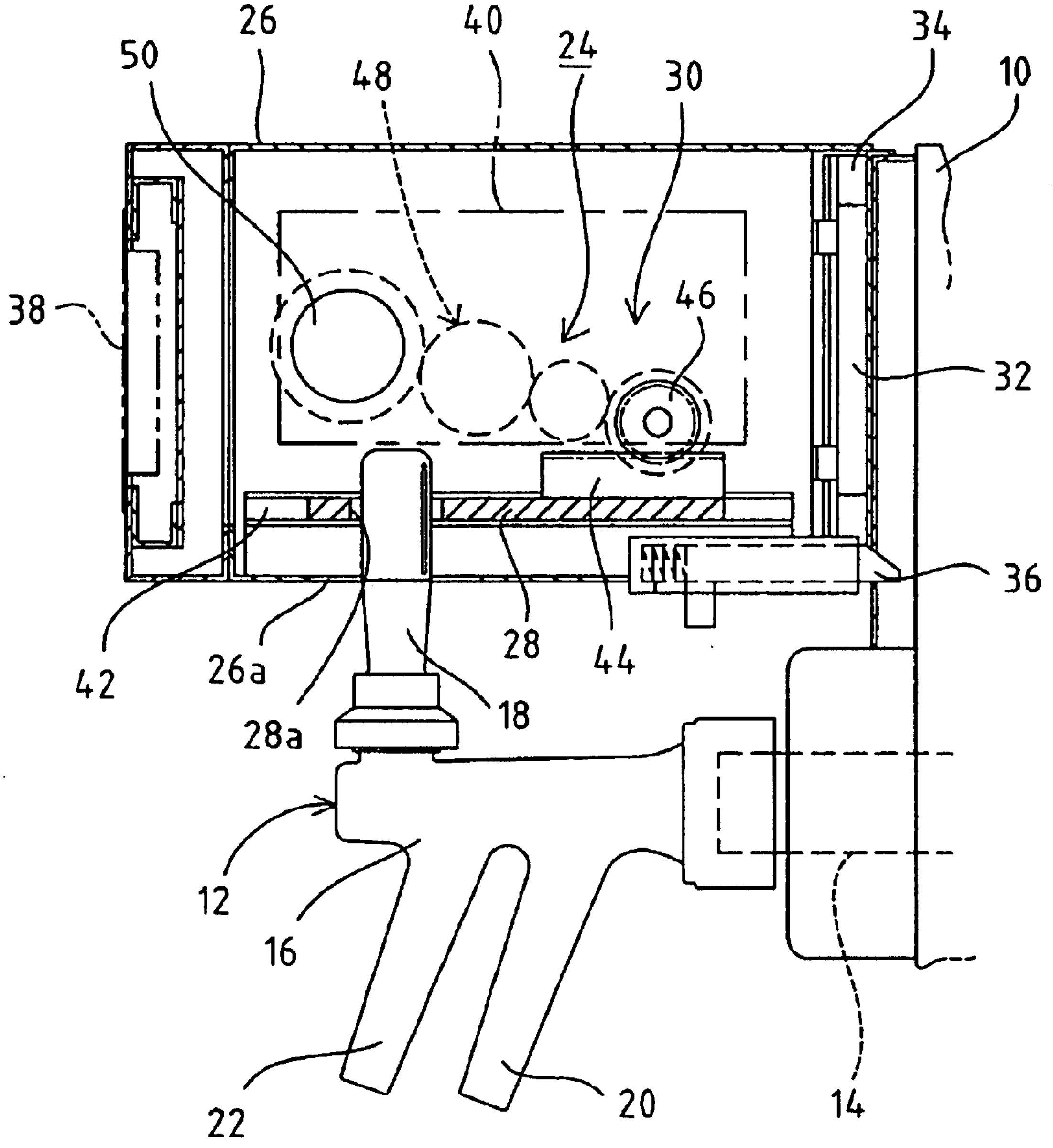
FIG. 3 is a vertical sectional view illustrating a main portion of a cock driving device according to the embodiment.

The cock driving device 24 for automatically manipulating the manipulating lever 18 is basically comprised of a slider 28 contained in a housing 26 arranged for vertical movements relative to the server body 10 and acting as an actuator for horizontally advancing and retracting movements; and a driving mechanism (driving means) 30 for advancing and retracting the slider 28. The housing 26, as illustrated in FIG. 3, is configured such that a sliding body 32 arranged therein is vertically slidably engaged with a guide 34 arranged on the front surface of the server body 10 to allow the cock driving device 24 to move between an inoperative position spaced upward from the dispensing cock 12 and an operative position close to the dispensing cock 12. The housing 26 is positioned at the inoperative position and the operative position with respect to the server body 10 through a latch 36 which is arranged in a rear portion of the bottom thereof. The housing 26 is also formed with a throughhole **26*a*, extending through a bottom plate thereof, which permits the manipulating lever 18 staying at the neutral position to be inserted therethrough and the lever 18** to be tilted back and forth.

A controller 38 which comprises dispensing buttons, a dispensing amount setting switch and the like is arranged in a front portion of the housing 26. The controller 38 is connected to a control board 40 arranged in the housing 26 as control means for controlling the operation of the beer server.

On the top of the bottom plate of the housing 26, a pair of opposing guide rails 42 (only one of which is illustrated) are arranged spaced apart in a width direction on both sides of the throughhole **26*a*. The guide rails 42 extend over a predetermined length in a front-to-back direction. The flat slider 28 is arranged on both guide rails 42 for horizontal movements in the front-to-back directions. The slider 28 is formed with an engagement hole 28*a* which permits the manipulating lever 18 to be inserted therethrough. When the housing 26 (cock driving device 24) is positioned at the operative position, the manipulating lever 18 is inserted through the engagement hole 28*a*, as illustrated in FIG. 3, and the engagement hole 28*a* is engaged with the manipulating lever 18 by forward and backward movements of the slider 28, so that the lever 18 can be tilted forward and backward. Also, when the housing 26 (cock driving device 24) is positioned at the inoperative position, the engagement hole 28*a* comes off the manipulating lever 18 upward, so that the manipulating lever 18** can be manually tilted in the front-to-back directions.

Figure 2:
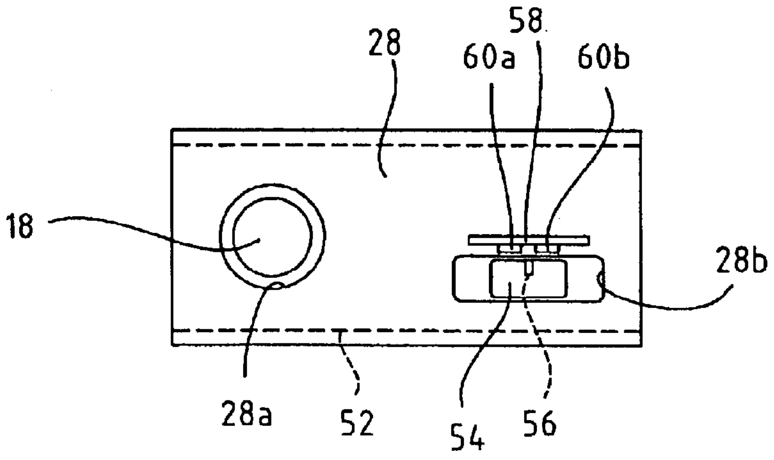
FIG. 2 is a plan view illustrating a main portion of a slider, the manipulating lever and a correcting apparatus according to the embodiment in a proper positional relationship.

The inner diameter of the engagement hole **28*a* is set larger than the outer diameter of a portion of the manipulating lever 18 which is inserted through the engagement hole 28*a* (see FIG. 2), so that when the cock driving device 24 is positioned at the correct operative position with respect to the manipulating lever 18 correctly positioned at the neutral position, a required gap is formed between the outer peripheral surface of the manipulating lever 18 and the inner peripheral surface of the engagement hole 28*a* at least in front of and at the back of the manipulating lever 18 in the tilting directions, as illustrated in FIG. 3. More specifically, even with a certain error in the positions at which the dispensing cock 12 and the cook driving device 24 are arranged with respect to the server body 10, the engagement hole 28*a* of the slider 28 can be fitted over and removed from the manipulating lever 18** smoothly without causing any problems.

The driving mechanism 30 is comprised of a rack 44 arranged on the top of the slider 28 and extending over a predetermined length in the front-to-back direction; a pinion

46 meshed with the rack 44; and a normally and reversely rotatable motor 50 connected to the pinion 46 through a gear train 48. Then, by normally and reversely rotating the pinion 46 by the motor 50, the slider 28 provided with the rack 44 meshed with the pinion 46 is horizontally moved in the front-to-back directions along a pair of guide rails 42, such that the slider 28 can be positioned at the advanced position (operative position), illustrated in FIG. 4, at which the manipulating lever 18 is tilted forward from the neutral position, and at a back position (operative position), illustrated in FIG. 5, at which the manipulating lever 18 is tilted backward from the neutral position.

In a state before the driving mechanism 30 is operated, the slider 28 is positioned at a standby position (a position in FIG. 3) at which the manipulating lever 18 staying at the neutral position can be inserted through the engagement hole 28*a*. The advanced position and the back position of the slider 28 are fixedly set based on the standby position in consideration of the gap formed between the manipulating lever 18 and the engagement hole 28*a*, such that beer and foam can be efficiently dispensed with the valve mechanism being held in a fully opened state.

The motor 50 comprises a position detector such as a pulse generator which outputs pulses to the control board 40, for allowing the control board 40 to monitor the amount of rotation (rotational speed) and a rotating direction of the motor 50. In this embodiment, the motor 50 is controlled to rotate back and forth by previously set front and rear numbers of pulses with reference to the standby position of the slider 28 to move the slider 28 to the advanced position and to the back position. Specifically, when the number of pulses of the motor 50 for moving the slider 28 from the standby position to the advanced position reaches a forward set value based on the standby position, the motor 50 is stopped and reversely rotated after the lapse of a predetermined dispensing time. Also, when the number of pulses of the motor 50 for moving the slider 28 to the back position reaches a backward set value based on the standby position after the slider 28 is once returned from the advanced position to the standby position, the motor 50 is stopped and reversely rotated after the lapse of the predetermined dispensing time. The stopping time of the motor 50, when the slider 28 reaches the advanced position and the back position is set in accordance with the amounts of dispensed beer and foam, and is previously set by the controller 38.

The manipulating lever 18 of the dispensing cock 12 is provided with an interlock member 62 which is positioned below the slider 28 for moving back and forth integrally with the lever 18, as illustrated in FIG. 1. The interlock member 52 is implanted with a holder 54 which is inserted from below through an elongated hole 28*b* drilled through the slider 28 and extending in the front-to-back direction. The holder 54 is configured movable in the front-to-back directions relative to the elongated hole 28*b*. Also, a magnet 56 is arranged as a sensed element at a site of the holder 54 above the slider 28. Further, on a mounting plate 58 implanted on the top of the slider 28, a pair of hole elements 60*a*, 60*b* are arranged one behind the other along a direction in which the slider 28 is moved, as sensing means capable of sensing the magnet 56. In this embodiment, with the manipulating lever 18 staying at the neutral position, the magnet 56 is set to face an intermediate position (regular position) of both hole elements 60*a*, 60*b* of the slider 28 staying at the standby position. The hole elements 60*a*, 60*b* magnetically detect a distance, so that a current position of the magnet 56 is sensed by the magnitude of magnetism detected by the front and rear hole elements 60*a*, 60*b*.

On the control board 40, the position of the slider 28, when the magnet 56 faces the intermediate position (regular position) of the pair of hole elements 60*a*, 60*b*, is set as the standby position, and the motor 50 is pulse-controlled in the manner described above based on the standby position. Also, when the slider 28 returns to the standby position from the advanced position or the back position, i.e., when the manipulating lever 18 is moved to the neutral position (closed position), the motor 50 is controlled to rotate to move the slider 28 for correction until the magnet 56 comes to the intermediate position of the hole elements 60*a*, 60*b*, if the magnet 56 is not positioned at the intermediate position of the pair of hole elements 60*a*, 60*b*. Then, the position of the slider 28 at which the magnet 56 reaches the intermediate position is set as a now standby position of the slider 28, so that the motor 50 is pulse-controlled from the next operation with reference to the new standby position. In this embodiment, a correcting apparatus is comprised of the interlock member 52, the magnet 56, the pair of hole elements 60*a*, 60*b*, and the control board 40.

(Operation of Embodiment)

Next, the operation of the beer server according to the embodiment will be described below. FIG. 1 illustrates the beer server in a state where the manipulating lever 18 for the dispensing cock 12 can be automatically manipulated by the cock driving device 24. In this event, the manipulating lever 18 remains at the neutral position before manipulation, and is inserted through the engagement hole 28*a* of the slider 28 which is positioned at the standby position. The magnet 56 of the interlock member 52 in turn is detected to face the intermediate position which is the regular position with respect to both hole elements 60*a*, 60*b*.

Figure 4:
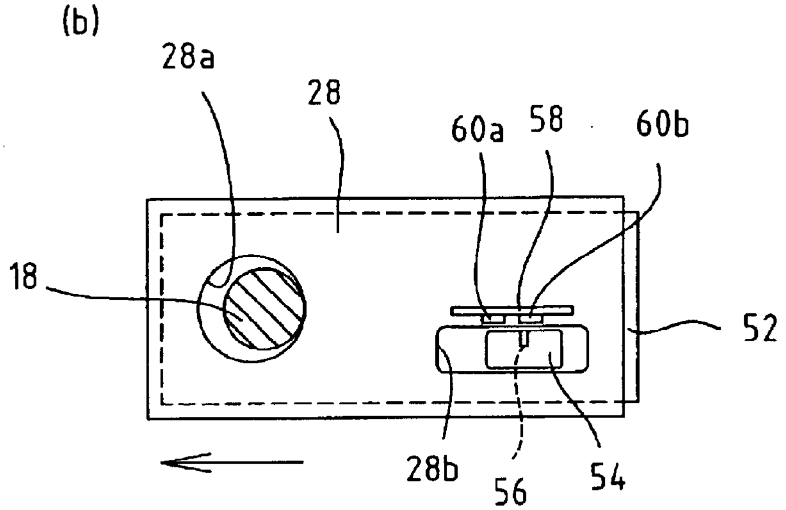
FIG. 4 shows a relationship among the slider, the manipulating lever and the correcting apparatus when the slider according to the embodiment is moved to the advanced position, wherein (a) is a diagram viewed from a side for describing the operation, and (b) is a diagram viewed from above for describing the operation.
Figure 4:
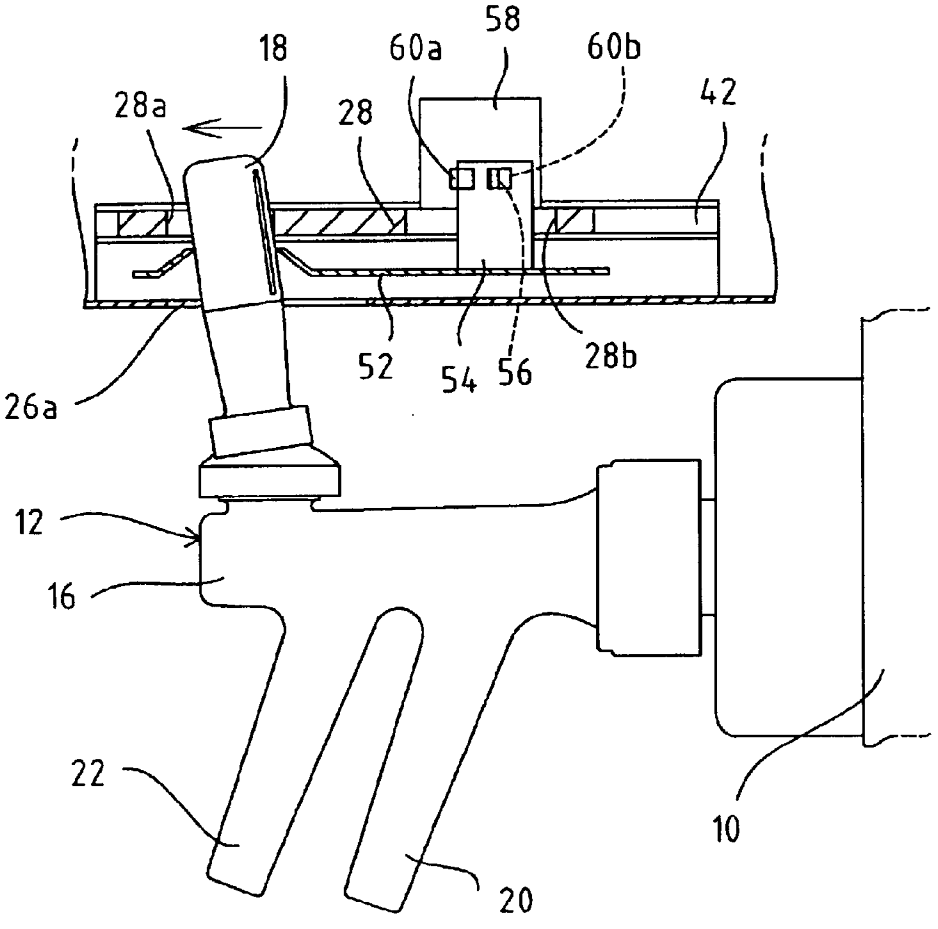

Depression on a dispensing button on the controller 38 arranged in a front portion of the housing 26 causes the motor 50 to rotate in a predetermined direction to move the slider 28 in front along the guide rails 42 through the gear train 48, the pinion 46 and the rack 44. With the forward movement of the slider 28, the inner peripheral surface of the engagement hole 28*a* comes into contact with the manipulating lever 18 to tilt the lever 18 forward, as illustrated in FIG. 4. As the slider 28 reaches the advanced position at which the manipulating lever 18 is tilted to the beer dispensing position (at the time the number of pulses reaches the preset value), the motor 50 is stopped, so that the slider 28 is positioned at the advanced position. In this way, beer in the beer supply pipe 14 is dispensed into a mug from the beer dispensing nozzle 20.

Figure 5:
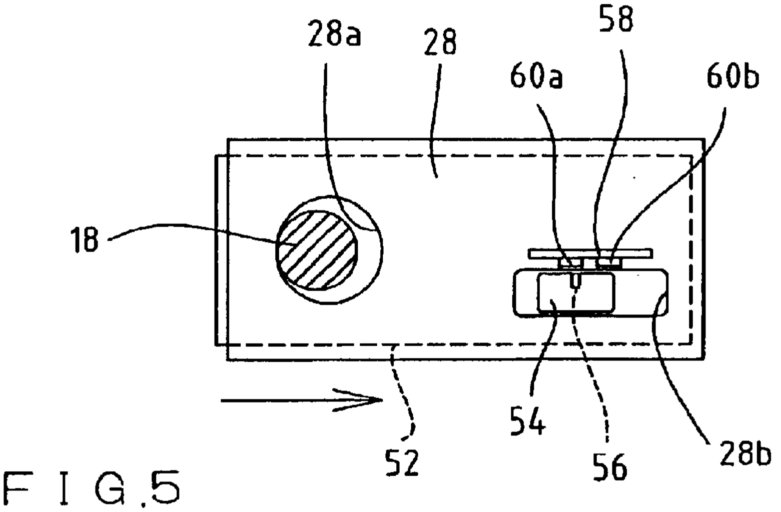
FIG. 5 shows a relationship among the slider, the manipulating lever and the correcting apparatus when the slider according to the embodiment is moved to the back position, wherein (a) is a diagram viewed from a side for describing the operation, and (b) is a diagram viewed from above for describing the operation.
Figure 5:
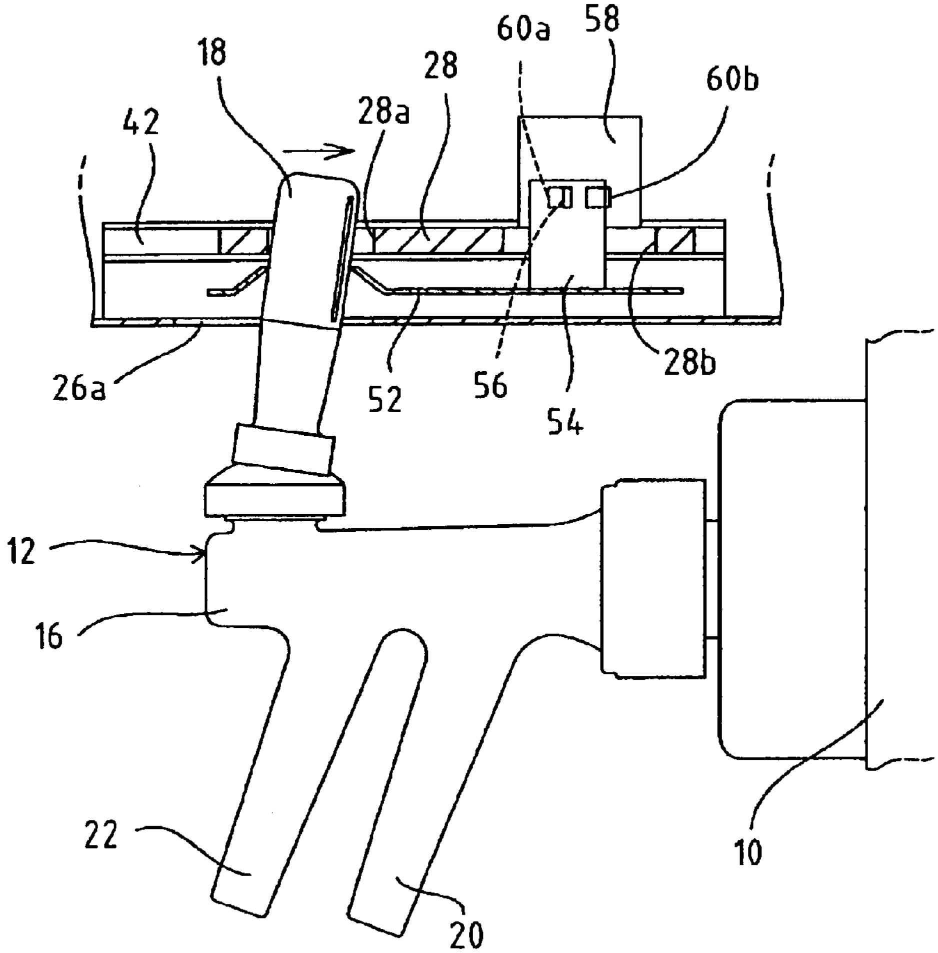

As a previously set beer dispensing time has elapsed, the motor 50 is reversely rotated, causing the slider 28 to move from the advanced position to the standby position and then retract toward the back position. With the backward movement of the slider 28, the manipulating lever 18 comes in contact with the inner peripheral surface of the engaging hole 28*a* to tilt the lever 18 backward, as illustrated in FIG. 5. As the slider 28 reaches the back position at which the manipulating lever 18 is tilted to the foam dispensing position (at the time the number of pulses reaches the backward set value), the motor 50 is stopped, so that the slider 28 is positioned at the back position. In this way, the beer from the beer supply pipe 14, formed into fine foam, is poured from the foam dispensing nozzle 22 on the beer stored in the mug.

Next, as a previously set foam dispensing time has elapsed, the motor 50 is again reversely rotated, causing the slider 28 to move forward from the back position to the standby position, so that the manipulating lever 18 returns to the neutral position, and the slider 28 is stopped at the standby position. In this event, even if the relative position of the manipulating lever 18 to the cock driving device 24 is shifted from the correct position, the manipulating lever 18 is prevented from coming in contact with the inner peripheral surface of the engagement hole 28*a* to fail to return to the neutral position because the inner diameter of the engagement hole 28*a* is set larger than the outer diameter of the manipulating lever 18, as mentioned above. Thus, the valve mechanism will never be held opened, preventing beer and foam from leaking from the associated nozzles 20, 22.

Figure 6:
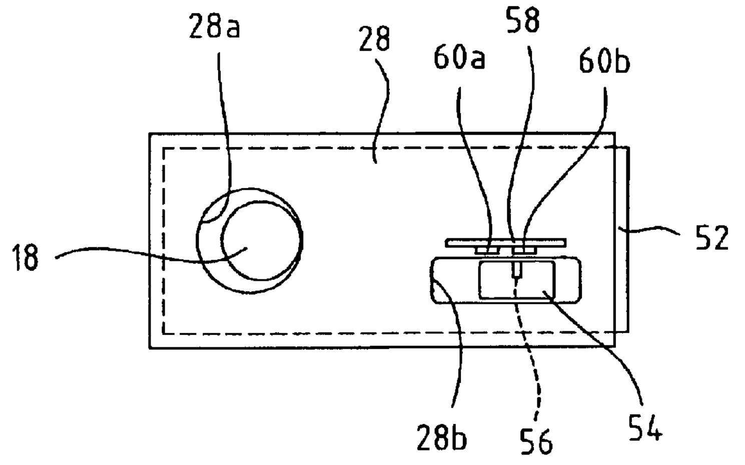
FIG. 6 shows a relationship between a magnet and hole elements when the manipulating lever is shifted backward with respect to an engagement hole of the slider according to the embodiment, wherein (a) is an explanatory diagram viewed from a side, and (b) is an explanatory diagram viewed from above.
Figure 6:
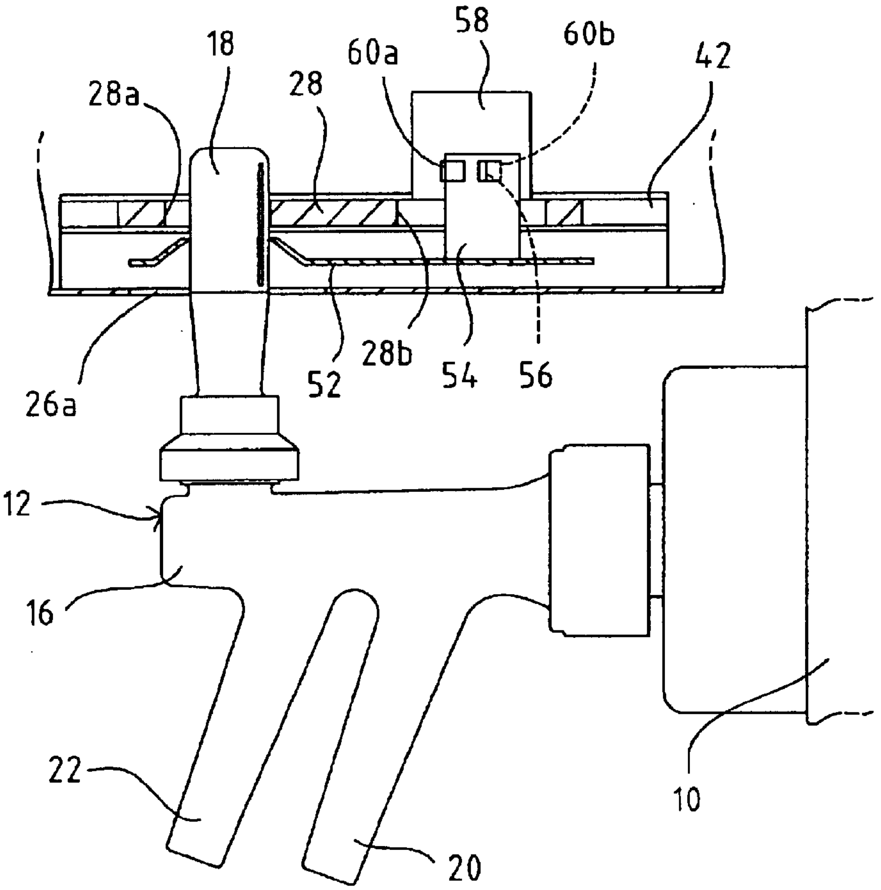
Figure 7:
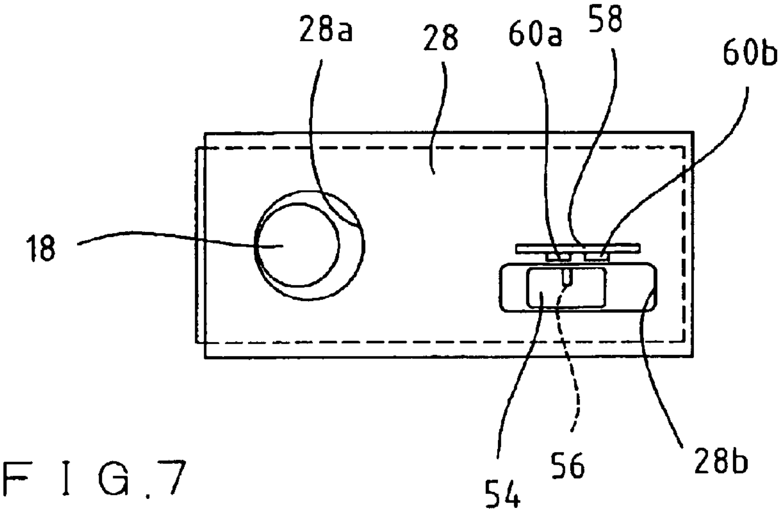
FIG. 7 shows a relationship between the magnet and the hole elements when the manipulating lever is shifted forward with respect to the engagement hole of the slider according to the embodiment, wherein (a) is an explanatory diagram viewed from a side, and (b) is an explanatory diagram viewed from above.
Figure 7:
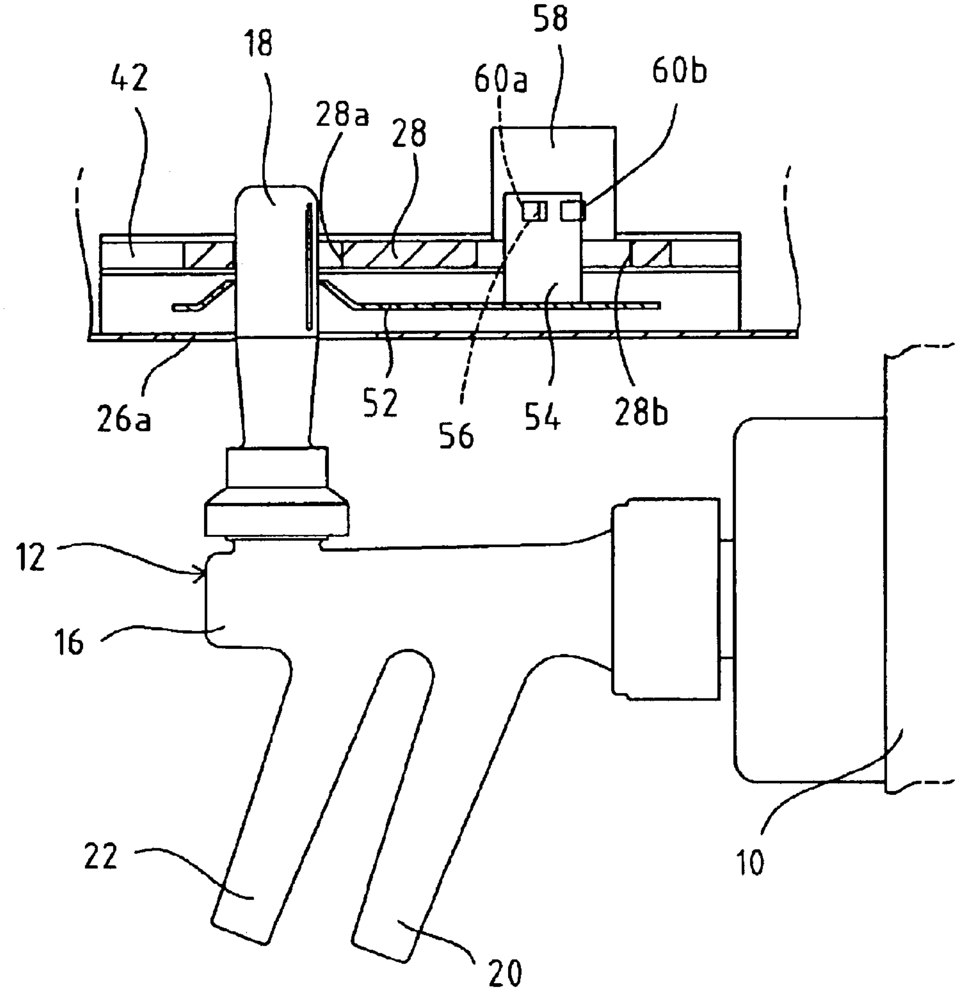

Here, the neutral position of the manipulating lever 18 may be shifted due to displaced positions at which the dispensing cock 12 and the cock driving device 24 are mounted with respect to the server body 10, or due to aging changes of the aforementioned rubber material and mounts. Consequently, as the slider 28 returns to the standby position, the position of the manipulating lever 18 with respect to the engagement hole 28*a* of the slider 28 would be shifted forward or backward as illustrated in FIGS. 6 and 7. In addition, even if the neutral position of the manipulating lever 18 remains unchanged, the slider 28 may not correctly return to the previously set standby position in some cases due to fluctuations in pressure of a load applied to the motor 50. In this event, a shift would occur in the relative position of the manipulating lever 18 to the slider 28, causing the magnet 56 to fail to reach the intermediate position of the pair of hole elements 60*a*, 60*b*. Specifically, in this event, since the hole elements 60*a*, 60*b* do not sense the arrival of the magnet 56 at the regular position, the control board 40 controls the motor 50 to rotate in a corresponding direction in accordance with the amount of shift of the magnet 56 with respect to the respective hole elements 60*a*, 60*b* to move the slider 28 for correction to a position at which the hole elements 60*a*, 60*b* sense that the magnet 56 reaches the intermediate position (regular position) of the hole elements 60*a*, 60*b*.

For example, when the magnet 56 is closer to the rear hole element 60*b* as illustrated in FIG. 6, the slider 28 is retracted. On the other hand, when the magnet 56 is closer to the front hole element 60*a* as illustrated in FIG. 7, the slider 28 is advanced, and the motor 50 is stopped at the time the magnet 56 reaches the intermediate position of both hole elements 60*a*, 60*b*. Then, the position of the slider 28 at this time is set as a new standby position, so that the motor 50 is pulse-controlled with reference to this standby position in a subsequent dispensing operation performed by the cock driving device 24. When the magnet 56 of the manipulating lever 18 reaches the intermediate position of the hole elements 60*a*, 60*b*, i.e., the regular position with respect to the slider 28 at the time the slider 28 has returned to the standby position, the correcting apparatus will not correct the standby position of the slider 28.

Thus, the cock driving device 24 correctly opens and closes the manipulating lever 18 at all times, without the manipulating lever 18 failing to fully open, or excessively tilted in the opening direction to apply an extra load on the manipulating lever 18. It is also possible to obviate the manipulating lever 18 from failing to precisely stop at the closed position to cause a leak. In the embodiment, since the motor 50 is pulse-controlled to move the slider 28 to the advanced position and the back position, no sensor or the like need be provided for actually sensing the slider 28, thereby reducing the number of parts and saving the space. Further, since the hole elements 60*a*, 60*b* are used as sensing means for the correction control, the correcting apparatus can be reduced in size.

(Modification)

Figure 8:
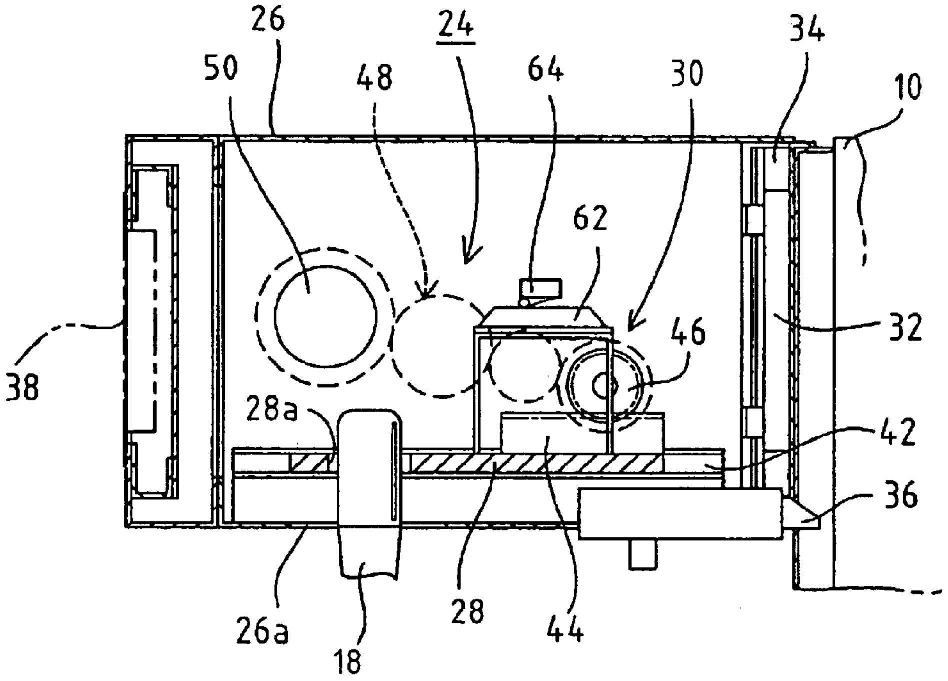
FIG. 8 is a vertical sectional view illustrating a main portion of a cock driving device which employs a feature for controlling the amount of movement of the slider according to a modification.
Figure 9:
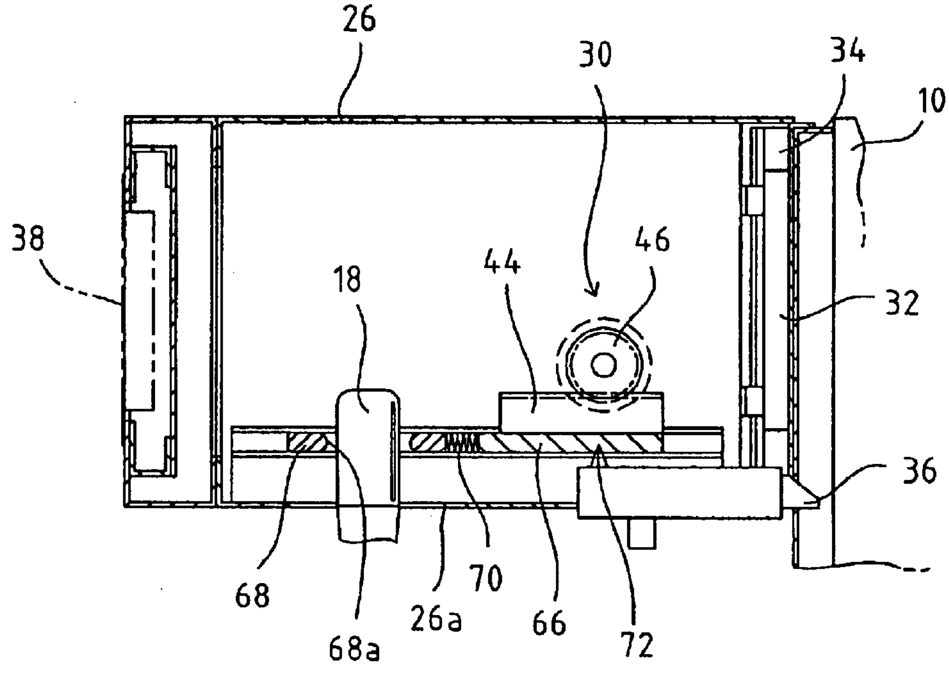
FIG. 9 is a vertical sectional view illustrating a main portion of a cock driving device which employs a slider according to the modification.

In the foregoing embodiment, while the amount of movement (the advanced position and the back position) of the slider 28 is set through the pulse control of the motor 50, the aforementioned correcting apparatus may be employed for a cock driving device 24 which is configured to set the advanced position and the back position of the slider 28 by a detecting switch 64 which turns ON/OFF by an operating piece 62 provided on the slider 28, for example, as illustrated in FIG. 8. The slider may be comprised of a driving slider section 66 provided with a rack 44 meshed with a pinion 46 of a driving mechanism 30; a driven slider section 68 formed with an engagement hole 68*a* through which the manipulating lever 18 is inserted; and a compression spring 70 as buffering means for integrally movably coupling both slider sections 66, 68. With the slider (actuator) 72 in this configurations when the driven slider section 68 is applied with a force exceeding a predetermined value, the driven slider 68 is allowed to come closer to or move away from the driving slider section 66, thereby making it possible to prevent an excessively large force from being applied to the manipulating lever 18 and the driving mechanism 30.

The driving means for horizontally advancing and retracting the slider is not limited to the configuration shown in the embodiment, but a variety of other mechanisms may be employed instead. Also, as the sensing means for sensing whether or not the sensed element of the manipulating lever has reached the regular position with respect to the actuator, a variety of sensors such as a proximity sensor and an opto-electric sensor may be used other than the hole element in the embodiment. When a proximity sensor or an opto-electric sensor is used, an associated sensed element may be formed of a material which can be sensed by the sensor.

As described above, the method and apparatus for correcting a cock driving device in a beverage dispenser according to the present invention senses a shift in the relative position of the manipulating lever staying at the closed position to the actuator staying at the standby position to correct the standby position of the actuator, so that the manipulating lever can be correctly manipulated to open/close through movements of the actuator. Therefore, even with an error in assembly of parts, aging changes and the like, the cock driving device correctly opens and closes the manipulating lever at all times, thereby preventing the manipulating lever from failing to fully open, preventing a load from being applied with the lever, and obviating the manipulating lever from failing to precisely stop at the closed position to cause a leak.

What is claimed is:

1. A method of correcting a cock driving device in a beverage dispenser in a cock driving device for use with a beverage dispenser comprising an actuator configured to come into engagement with a manipulaling lever for a dispensing cock arranged on a body, the method comprising the steps of:

moving said actuator to a standby position and to an operative position to move said manipulating lever to a closed position and to an open position;

sensing by sensing means provided in said actuator whether or not a sensed element of said manipulating lever staying at said closed position reaches a regular position with respect to said actuator staying at said standby position; and moving said actuator for correction to a position at which said sensing means senses the arrival of said sensed element at the regular position, and setting this position as a new standby position if said sensing means does not sense the arrival of said sensed element at the regular position.

2. An apparatus for correcting a cock driving device in a beverage dispenser in a cock driving device for use with a beverage dispenser, said apparatus comprising:

an actuator configured to come into engagement with a manipulating lever for a dispensing cock arranged on a body, wherein said actuator is moved to a standby position and to an operative position to move said manipulating lever to a closed position and to an open position;

a sensed element arranged in an intetlock member integrally movable with said manipulating lever;

sensing means arranged in said actuator for sensing whether or not said sensed element of said manipulating lever staying at the closed position reaches a regular position with respect to said actuator; and control means for moving said actuator for correction to a position at which said sensing means senses the arrival of said sensed element at the regular position if said sensing means does not sense the arrival of said sensed element at the regular position when said actuator is moved from the operative position to the standby position to move said manipulating lever from the open position to the closed position.

* * * * *